(12) United States Patent
DeFreitas

(10) Patent No.: US 6,521,833 B1
(45) Date of Patent: Feb. 18, 2003

(54) ELECTRICAL CONDUIT JUNCTION BOX SELF-SECURING INSERT SYSTEM

(76) Inventor: Glennon L. DeFreitas, #4 - 14191 Burrows Rd., Richmond, B.C. (CA), V6V 1K9

( * ) Notice: Subject to any disclaimer, the term of this patent is extended or adjusted under 35 U.S.C. 154(b) by 0 days.

(21) Appl. No.: 10/013,735

(22) Filed: Dec. 7, 2001

(51) Int. Cl.[7] ................................................. H02G 3/18
(52) U.S. Cl. ........................ 174/65 R; 174/50; 220/3.2
(58) Field of Search ............................ 174/65 R, 65 G, 174/65 SS, 66, 50, 48; 220/3.2, 3.3, 241; 285/3, 4

(56) References Cited

U.S. PATENT DOCUMENTS

| | | | | |
|---|---|---|---|---|
| 3,858,151 A | * | 12/1974 | Paskert | 174/51 |
| 4,012,578 A | * | 3/1977 | Moran et al. | 174/51 |
| 4,836,580 A | * | 6/1989 | Farrell | 285/133.11 |
| 4,864,080 A | * | 9/1989 | Fochler et al. | 174/65 G |
| 4,880,387 A | * | 11/1989 | Stikeleather et al. | 174/65 R |
| 5,068,496 A | * | 11/1991 | Favalora | 174/65 R |
| 5,094,482 A | * | 3/1992 | Petty et al. | 285/319 |
| 5,373,106 A | * | 12/1994 | O'Neil et al. | 174/65 R |
| 5,679,924 A | * | 10/1997 | Young et al. | 174/50 |
| 5,783,774 A | * | 7/1998 | Bowman et al. | 174/48 |
| 5,912,431 A | * | 6/1999 | Sheehan | 174/65 R |
| 5,939,675 A | * | 8/1999 | Defreitas | 174/65 R |
| 6,034,326 A | * | 3/2000 | Jorgensen | 174/65 R |
| 6,114,630 A | * | 9/2000 | Gretz | 174/51 |
| 6,352,439 B1 | * | 3/2002 | Stark et al. | 174/65 R |
| 6,380,483 B1 | * | 4/2002 | Blake | 16/2.1 |

* cited by examiner

*Primary Examiner*—Dean A. Reichard
*Assistant Examiner*—Angel R. Estrada

(57) ABSTRACT

The invention relates to an improved system for securing electrical conduit into a junction box. The invention provides a cylindrical insert that fits into one of a plurality of tubular projections on the junction box. The insert is slightly longer than the tubular projection and has a diameter sized to slidably fit within the tubular projection. An outer flanged rim on one end of the insert prevents it sliding further into the tubular projection. A split flanged rim on the other end allows the other end to flex together to allow insertion of the insert into the tubular projection. A split inner rim operates in conjunction with a disposable end plug having a conical face that allows insertion of a corrugated electrical conduit to flex apart the other end when it protrudes from an inner end of the tubular projection. The split inner rim snaps into a groove between raised rings of the corrugated electrical conduit and secures it against withdrawal by a pulling force. Any such pulling causes the insert to move with its split flanged rim against the inner end of the tubular projection such that the inner split rim will not release the end of the corrugated electrical conduit.

12 Claims, 4 Drawing Sheets

ELECTRICAL CONDUIT JUNCTION BOX SELF-SECURING INSERT SYSTEM

BACKGROUND OF THE INVENTION

This invention relates to electrical conduit junction boxes and means for securing the end of electrical conduit in such boxes. It is common to use electrical conduit to contain electrical wires for safety within walls or floors during construction of a building. Indeed, it part of building code requirements in many places to use such conduit. In the case of conduit that is to be buried in concrete floors, it is usual to use plastic electrical conduit consisting of a tube having rings of thicker diameter around the tube at closely spaced regular intervals. The narrower diameter grooves allow for increased flexibility while the thicker plastic in the rings provides additional strength. The rings are typically formed such that the walls of the rings abut the tube at a ninety degree angle. This allows an external gripping ring that can somehow be fitted around the tube in a groove formed by such walls to grip the ring and restrain against longitudinal pulling forces exerted on the electrical conduit.

DESCRIPTION OF THE PRIOR TECHNOLOGY

Mechanisms that have been used previously to secure electrical conduit to a junction box have included having a flexible flange built into an aperture in the junction box, or having a like arrangement on a separate conduit end attachment that is then attached by threaded end and nut means in an aperture on the junction box.

Difficulties with such attachment mechanisms have occurred due to the significant pulling forces that can be applied to the conduit when heavy concrete is poured or other forces during construction are exerted on the conduit. The flexible flanges can fail by popping away from the conduit. If the flanges fail and the conduit pops out of the box, it can place stress on the electrical wire inside the junction box and can break the connection. Also, in the case of cement pours around the box, cement can enter the junction box and adversely affect the electrical connections within the box. In the case of the thread and nut conduit end piece, extra labor is involved in attaching the piece to the junction box.

SUMMARY AND OBJECTS OF THE INVENTION

The invention provides a generally cylindrical self-securing insert that operates by fitting into one of a plurality of tubular projections on the junction box. The self-securing insert is slightly longer than the tubular projection and has a diameter sized to slidably fit within the tubular projection. An outer flanged rim on one end of the self-securing insert prevents it sliding further into the tubular projection. A split flanged rim on the other end of the self-securing insert allows the other end to flex together to allow insertion of the self-securing insert into the tubular projection. An inner split rim adjacent to the split flanged rim operates in conjunction with a disposable end plug having a conical face that allows insertion of a corrugated electrical conduit to flex apart the split flanged rim when it protrudes from an inner end of the tubular projection. The inner split rim snaps into a groove between raised rings of the corrugated electrical conduit and secures it against withdrawal by a pulling force. Any such pulling causes the insert to move with its split flanged rim against the inner end of the tubular projection such that the inner split rim will not release the end of the corrugated electrical conduit. The self-securing insert can be made of a tough resilient plastic to enable it to flex for insertion of the corrugated electrical conduit and yet be strong enough to retain the corrugated electrical conduit upon substantial pulling force being exerted on the electrical conduit.

The self-securing insert can be used with pre-existing electrical junction boxes having tubular projections. Such boxes often have a pop-out plate in their tubular projections to keep cement and other construction debris from passing into the box through those projections that are unused and unfilled by a length of electrical conduit. A like pop-out disposable end plug can be used for the self-securing insert itself, the plug having a conical face that assists in pushing the plug and thence the electrical conduit end past the outwardly flexing inside split rim of the self-securing insert.

One preferred embodiment of the invention would be a self-securing insert system for electrical conduit junctions, comprising:

a) a generally cylindrical portion slightly longer than a tubular projection of an electrical conduit junction box into which tubular projection the self-securing insert is to be used;

b) an outer flanged rim on one end of the self-securing insert to prevent it from sliding through the tubular projection;

c) an opposite end of the self-securing insert having a plurality of end portions separated by splits aligned with the length of the cylinder, to allow the end portions to flex together for insertion of the self-securing insert into the tubular projection;

d) a plurality of split flanged outer rim portions extending from the end portions to prevent the self-securing insert from being pulled out of the tubular projection without flexing the end portions together;

e) a plurality of inner split rim portions on the end portions, the inner split rim portions being sized to fit between corrugation rings on a length of electrical conduit;

f) the end portions being made of a tough, resilient plastic material to enable flexing inward for insertion of the self-securing insert into the tubular projection, and to enable flexing outward for insertion into the self-securing insert of an end of a length of electrical conduit having corrugation rings;

g) the self-securing insert being supplied with a pop-out disposable end plug having a conical face for spreading out the end portions upon a length of electrical conduit pushing the pop-out disposable end plug through the self-securing insert;

h) an electrical junction box with a multiplicity of tubular projections sized to slidably receive the self-securing insert;

c) a plurality of such self-securing inserts are inserted into respective tubular projections on the electrical junction box, such that each outer flanged rim is adjacent to an outer end of each tubular projection, and each split flanged rim portion is adjacent to an area where an inner portion of a tubular projection is joined to the electrical junction box;

d) at least four end portions separated by splits aligned with the length of the cylinder, to allow the end portions to flex together for insertion of the self-securing insert into the tubular projection, and to reflex when released back into an unflexed state, and e) each end portion having a split flanged outer rim portion to prevent the end portions from being pulled back out of the tubular projection; and an inner flanged rim portion to grip between corrugated rings of a length of conduit.

There exist electrical conduits of different diameters. The self-securing insert system accommodates the junction of a variety of such conduit, by having in a preferred embodiment an electrical junction box having a multiplicity of tubular projections of various sizes to slidably receive a multiplicity of like self-securing inserts of various sizes respectively, the tubular projections and the self-securing inserts being thereby adapted to receive and secure a multiplicity of electrical conduits having various diameters.

DETAILED DESCRIPTION

Figure 1:
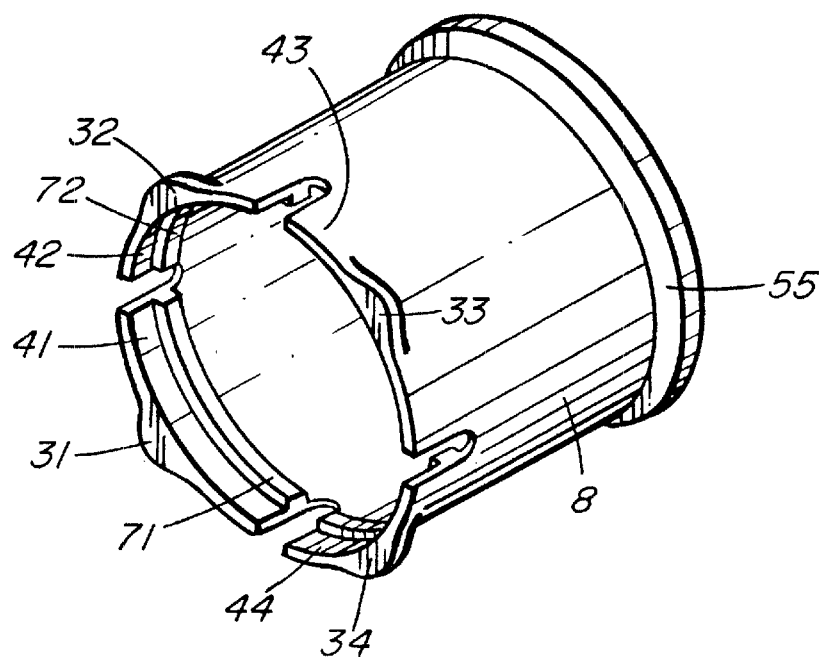
FIG. 1 is a perspective view of the self-securing insert.
Figure 2:
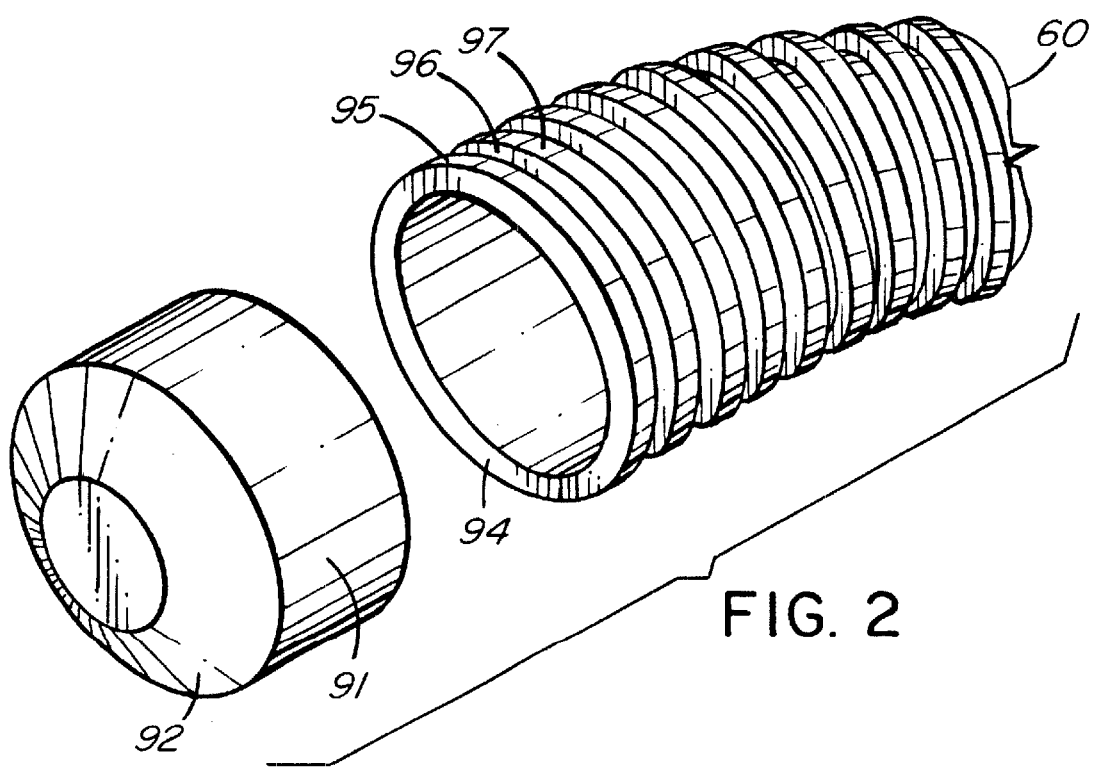
FIG. 2 is a perspective view of the disposable end plug of the present invention, and a length of corrugated electrical conduit.
Figure 3:
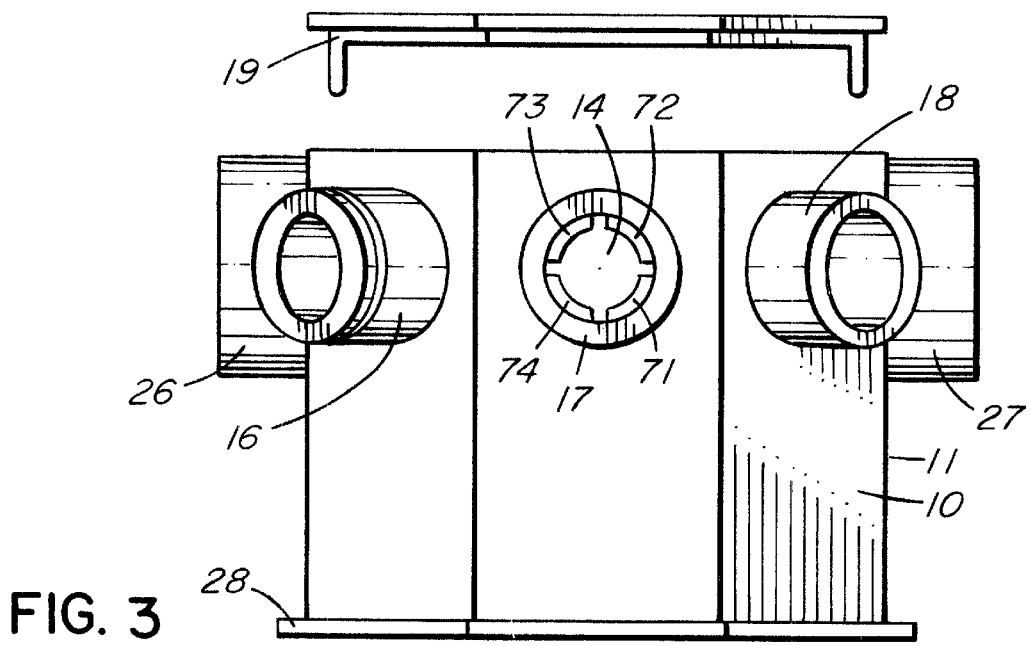
FIG. 3 is a side view of the electrical junction box, with its tubular projections and its lid.
Figure 7:
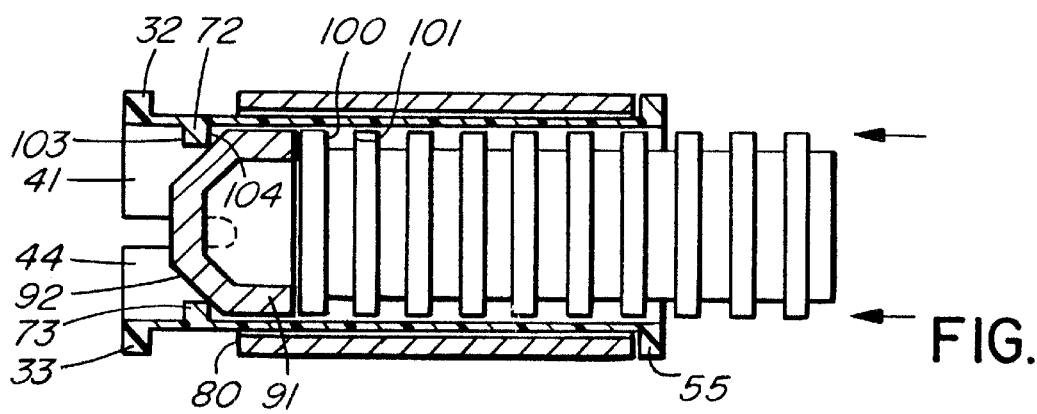
FIG. 7 is a side cross-sectional view of the self-securing insert and the end plug, in a tubular projection on an electrical junction box, with a length of corrugated electrical conduit being pressed against the end plug.

Referring to FIGS. 1 and 2, the self-securing insert 8 is provided with a disposable end plug 91 which has a conical face 92. The conical face 92 will contact the inner flanged rim portions 71 and 72 (and 73 and 74 as shown in FIG. 3), when the disposable end plug 91 is inserted into the self-securing insert 8. When an electrical conduit end 94 then pushes the disposable end plug 91 against the inner flanged rim portions 71 and 72, the end portions 41–44 will flex apart, allowing the disposable end plug 91 to drop disposably into a junction box in which the self-securing insert 8 is used, and allowing the electrical conduit end 94 to follow past the inner flanged rim portions 71 and 72 into a position of engagement of the inner flanged rim portions 71 and 72 with the first groove 96 between the first raised ring 95 and the second raised ring 97 of the corrugated electrical conduit 60, the rings of the corrugated conduit having substantially perpendicular walls (e.g. 101 and 102) that match the walls 103 and 104 of the inner flanged rim portion, as shown in FIG. 7. The first raised ring 95 and the second raised ring 97 as well as the other raised rings of the corrugated electrical conduit 60 are formed with larger diameter material about a tube that is more flexible in each groove, such as 96, than at each ring. The outer flanged rim 55 of the self-securing insert will restrict it from being pushed right through an electrical junction box's tubular projection of smaller interior diameter than the outer flanged rim 55.

Referring to FIG. 3, the junction box 11 includes molded plastic housing 10 having a hollow interior 14, a lid 19, and a base 28. A plurality of hollow tubular projections 16, 17, 18, 26, and 27, extend outwardly from the housing 10. In the embodiment shown in FIGS. 3–5, sidewall 12 includes a regularly connected set of rectangular panels as at 21, 22, 23 forming a continuous polygonal shape.

Figure 4:
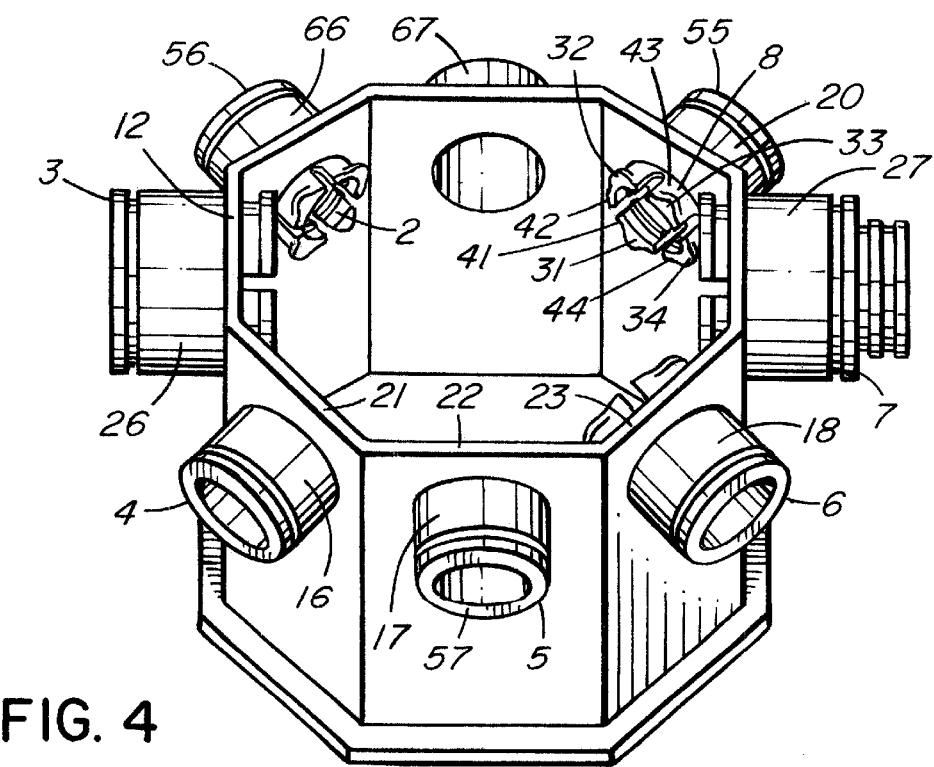
FIG. 4 is a perspective view of the electrical junction box fitted with self-securing inserts.

Referring to FIG. 4, into a plurality of the hollow tubular projections 16, 17, 18, 27, 68, 67, 66, and 26 have been inserted sized self-securing inserts, respectively 2 through 8. The outer flanged rims as at 55, 56, 57 of the self-securing inserts keep the respective insert from being pushed right through the hollow tubular projections and into the junction box 11. The split flanged rim portions 31–34 on the end portions 41–44 on self-securing insert 8 keep the self-securing insert 8 from being pulled out of the junction box, unless the end portions 41, 42, 43, and 44 are bent inwards toward the central axis of the self-securing insert 8. The flexibility of the end portions 41–44 likewise has allowed the self-securing insert 8 to be inserted within the hollow tubular projection 20 in the first place, with the split flanged rim portions 31–34 being compressed toward each other along with the respective end portions 41–44 and the respective inner flanged rim portions 71–74 during the insertion of the self-securing insert.

Figure 5:
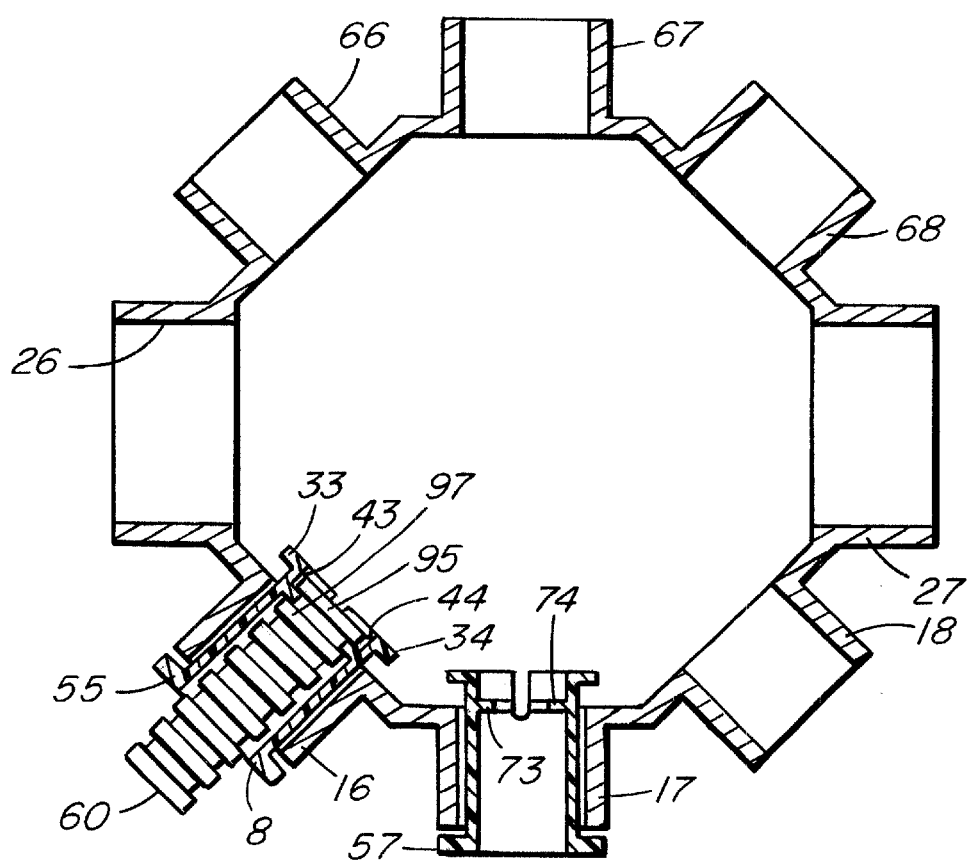
FIG. 5 is a top cross-sectional view of the electrical junction box fitted with self-securing inserts and some electrical conduits.
Figure 6:
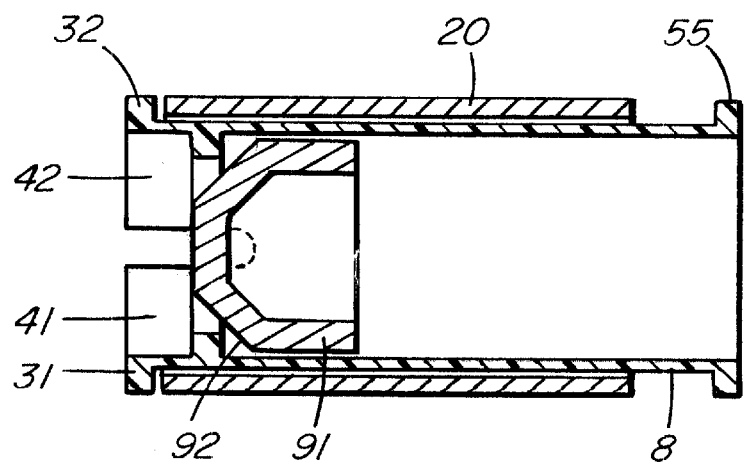
FIG. 6 is a side cross-sectional view of the self-securing insert and the end plug, in a tubular projection on an electrical junction box.
Figure 8:
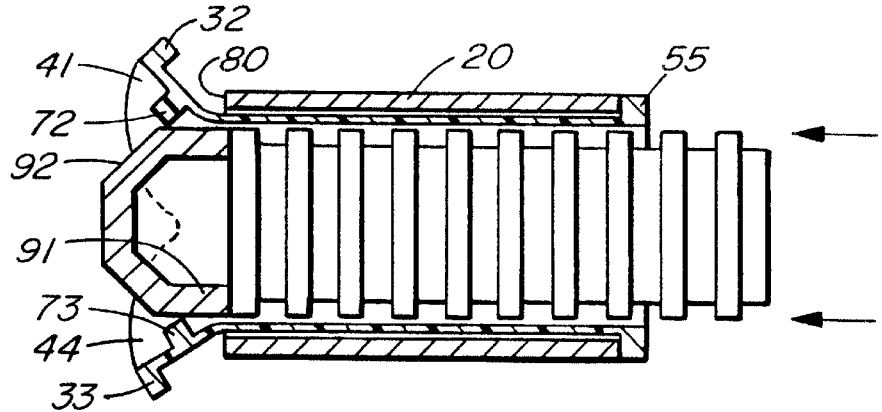
FIG. 8 is a side cross-sectional view of the self-securing insert and the end plug, in a tubular projection on an electrical junction box, with a length of corrugated electrical conduit pressing the end plug through the end of the self-securing insert.
Figure 9:
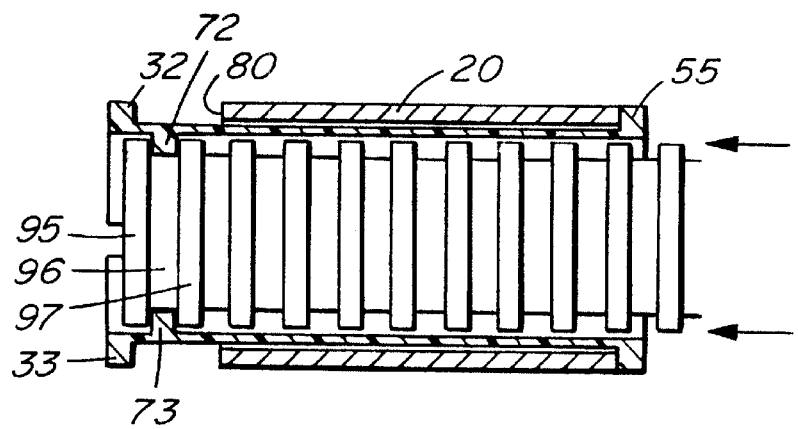
FIG. 9 is a side cross-sectional view of the self-securing insert in a tubular projection on an electrical junction box, with a length of corrugated electrical conduit fitted into the self-securing insert.

Referring to FIGS. 5 and 6, the length of the self-securing insert 8 from the split flanged rim portions 31–34 to the outer flanged rim 55 is longer that the inner length of the hollow tubular projection 16 that surrounds it, by a difference slightly longer than the end portions. This allows the end portions 41–44 to flex outwardly upon a length of corrugated electrical conduit 60 being pushed into the self-securing insert 8 within the hollow tubular projection 20, to accommodate the larger diameter raised rings 95 and 96 on the corrugated electrical conduit 60, as shown in FIGS. 7 and 8. The inside flanged rim portions 71–74 are sized to snap into a groove as at 96, formed between the larger diameter raised rings 95 and 97, as shown in FIG. 9.

Figure 10:
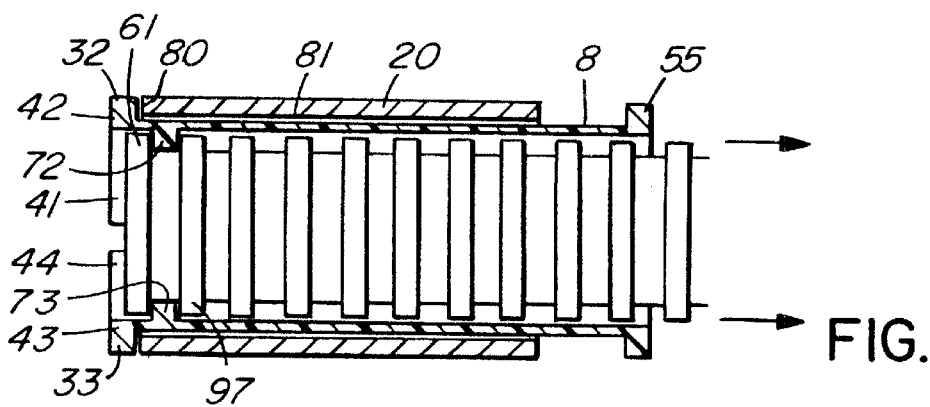
FIG. 10 is a side cross-sectional view of the self-securing insert within a tubular projection on an electrical junction box, with a length of corrugated electrical conduit secured by the self-securing insert.

Referring to FIG. 10, a withdrawing force exerted on the corrugated electrical conduit 60 that has been thus inserted into the self-securing insert 8 within the hollow tubular projection 20 causes the insert to move slightly backwards until the wall 80 of the hollow tubular projection 20 abuts the split flanged rim portions 31–34. Its end portions cannot flex outward to release the inner flanged rim portions from the groove 96, because the interior cylinder wall 81 of the tubular projection prevents this. The electrical conduit itself prevents the split flanged rim portions from flexing inward, so the self-securing insert 8 can be withdrawn no further.

The self-securing insert can be molded in one piece of resilient plastic, with the flexibility of the end portions assisting also in removal of the self-securing insert from its mold.

The within-described invention may be embodied in other specific forms and with additional options and accessories without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalence of the claims are therefore intended to be embraced therein.

I claim:

1. A self-securing insert for electrical conduit junction boxes, comprising:
   a) a generally cylindrical portion slightly longer than a tubular projection of an electrical conduit junction box into which tubular projection the self-securing insert is to be used;
   b) an outer flanged rim on one end of the self-securing insert to prevent it from sliding trough the tubular projection;
   c) an opposite end of the self-securing insert having a plurality of end portions separated by splits aligned with the length of the cylinder, to allow the end portions to flex together for insertion of the self-securing insert into the tubular projection,
   d) a plurality of split flanged outer rim portions on the end portions to prevent the self-securing insert from being pulled out of the tubular projection without flexing the end portions together;
   e) a plurality of inner flanged rim portions on the end portions, the inner flanged rim portions being sized to fit between corrugation rings on a length of electrical conduit;
   f) a pop-out disposable end plug with a conical face for spreading out the end portions upon a length of electrical conduit pushing the pop-out disposable end plug through the self-securing insert.

2. The self-securing insert of claim 1 in which the end portions are made of a tough resilient plastic material to enable flexing inward for insertion of the self-securing insert into the tubular projection, and to enable flexing outward for insertion into the self-securing insert of an end of a length of electrical conduit having corrugation rings.

3. The self-securing insert of claim 1, further comprising an electrical junction box with a multiplicity of tubular projections sized to slidably receive the self-securing insert.

4. The self-securing insert of claim 3, inserted into a tubular projection such that the outer flanged rim abuts an outer end of the tubular projection.

5. The self-securing insert of claim 4, inserted into a tubular projection such that the plurality of split flanged rim portions on the end portions abut an inner portion of the tubular projection adjacent to where the tubular projection is joined to the electrical junction box.

6. The self-securing insert of claim 1, further comprising an electrical junction box with a multiplicity of tubular projections of various sizes to slidably receive a multiplicity of like self-securing inserts of various sizes respectively, the tubular projections and the self-securing inserts being thereby adapted to receive and secure a multiplicity of electrical conduits having various diameters.

7. The self-securing insert of claim 1, in which there are at least four end portions separated by splits aligned with the length of the cylinder, to allow the end portions to flex together for insertion of the self-securing insert into the tubular projection.

8. The self-securing insert of claim 1, in which each end portion has a split flanged rim portion.

9. The self-securing insert of claim 1, in which each end portion has an inner flanged rim portion.

10. A self-securing insert for electrical conduit junction boxes, comprising:
    a) a generally cylindrical portion slightly longer than a tubular projection of an electrical conduit junction box into which tubular projection the self-securing insert is to be used;
    b) an outer flanged rim on one end of the self-securing insert to prevent it from sliding through the tubular projection;
    c) an opposite end of the self-securing insert having a plurality of end portions separated by splits aligned wit the length of the cylinder, to allow the end portions to flex together for insertion of the self-securing insert into the tubular projection;
    d) a plurality of split flanged outer rim portions on the end portions to prevent the self-securing insert from being pulled out of the tubular projection without flexing the end portions together;
    e) a plurality of inner flanged rim portions on the end portions, the inner flanged rim portions being sized to fit between corrugation rings on a length of electrical conduit;
    f) a pop-out disposable end plug with all angled front portion for spreading out the end portions upon a length of electrical conduit pushing the pop-out disposable end plug through the self-securing insert.

11. The self-securing insert of claim 10, further comprising:
    a) an electrical junction box with a multiplicity of tubular projections sized to slidably receive the self-securing insert;
    b) the self-securing insert inserted into a tubular projection such that the outer flanged rim abuts an outer end of the tubular projection;
    c) at least four end portions separated by splits aligned wit the length of the cylinder, to allow the end portions to flex together for insertion of the self-securing insert into the tubular projection;
    d) each end portion having a split flanged outer rim portion to prevent the end portions from being pulled back out of the tubular projection; and an inner flanged rim portion to grip between corrugated rings of a length of conduit.

12. The self-securing insert of claim 11, in which the electrical junction box has a multiplicity of tubular projections of various sizes to slidably receive a multiplicity of like self-securing inserts of various sizes respectively, the tubular projections and the self-securing inserts being thereby adapted to receive and secure a multiplicity of electrical conduits having various diameters.

* * * * *